(12) United States Patent
Sakai et al.

(10) Patent No.: US 9,703,152 B2
(45) Date of Patent: Jul. 11, 2017

(54) LIQUID CRYSTAL DISPLAY DEVICE

(71) Applicant: Japan Display Inc., Tokyo (JP)

(72) Inventors: Takeshi Sakai, Tokyo (JP); Toshimasa Ishigaki, Tokyo (JP); Yasushi Tomioka, Tokyo (JP)

(73) Assignee: Japan Display Inc., Tokyo (JP)

(*) Notice: Subject to any disclaimer, the term of this patent is extended or adjusted under 35 U.S.C. 154(b) by 166 days.

(21) Appl. No.: 14/458,314

(22) Filed: Aug. 13, 2014

(65) Prior Publication Data

US 2015/0055043 A1 Feb. 26, 2015

(30) Foreign Application Priority Data

Aug. 20, 2013 (JP) .................................. 2013-170268

(51) Int. Cl.
G02F 1/1343 (2006.01)
G02F 1/1333 (2006.01)
G02F 1/1362 (2006.01)

(52) U.S. Cl.
CPC .. G02F 1/134363 (2013.01); G02F 1/133345 (2013.01); G02F 1/136227 (2013.01); *G02F 2001/134372* (2013.01)

(58) Field of Classification Search
CPC ............... G02F 2001/134372; G02F 1/134363
See application file for complete search history.

(56) References Cited

U.S. PATENT DOCUMENTS

| 6,034,757 | A | 3/2000 | Yanagawa et al. |
| 2005/0041182 | A1* | 2/2005 | Ono .................. G02F 1/134363 |
| | | | 349/106 |
| 2007/0026556 | A1 | 2/2007 | Kitagawa et al. |
| 2008/0100787 | A1* | 5/2008 | Segawa ............. G02F 1/134363 |
| | | | 349/141 |
| 2012/0099066 | A1* | 4/2012 | Ougiichi ........... G02F 1/133345 |
| | | | 349/138 |

FOREIGN PATENT DOCUMENTS

| JP | 9-105918 A | 4/1997 |
| JP | 2004-302448 A | 10/2004 |
| JP | 2008-116484 A | 5/2008 |
| JP | 2012-88582 A | 5/2012 |
| JP | 2012-108387 A | 6/2012 |

OTHER PUBLICATIONS

Japanese Office Action mailed on May 9, 2017, for corresponding Japanese Patent Application No. 2013-170268.

* cited by examiner

*Primary Examiner* — Wen-Ying P Chen
(74) *Attorney, Agent, or Firm* — Typha IP LLC

(57) ABSTRACT

In an IPS mode liquid crystal display device, a counter electrode is formed flat on a first insulating film. A second insulating film is formed in the peripheral portion of the counter electrode. A third insulating film is formed so as to cover the counter electrode and the second insulating film. A pixel electrode is formed on the third insulating film. The second and third insulating films are present between the pixel electrode and the counter electrode in the periphery of the pixel. The third insulating film is present between the pixel electrode and the counter electrode in the portion other than the peripheral portion of the pixel. An electric field between the pixel electrode and the counter electrode is smaller in the periphery of the pixel than in the vicinity of the center of the pixel, to prevent the occurrence of a domain in the periphery of the pixel.

5 Claims, 13 Drawing Sheets

A-A

LIQUID CRYSTAL DISPLAY DEVICE

CLAIM OF PRIORITY

The present application claims priority from Japanese Patent Application JP 2013-170268 filed on Aug. 20, 2013, the content of which is hereby incorporated by reference into this application.

BACKGROUND

The present invention relates to a display device, and more particularly, to a liquid crystal display device with a high definition screen in a lateral electric field mode that prevents the occurrence of a domain.

A liquid crystal display device includes a TFT substrate in which pixels having pixel electrodes, thin film transistors (TFT) and the like are formed in a matrix, as well as a counter substrate in which color filters and the like are formed at the positions corresponding to the pixel electrodes of the TFT substrate. The counter substrate is disposed opposite the TFT substrate with a liquid crystal interposed between the TFT substrate and the counter substrate. Then, the transmittance of light caused by liquid crystal molecules is controlled at every pixel to form images.

Liquid crystal display devices are flat and lightweight and have been applied in various fields. Small liquid crystal display devices are widely used in mobile phones, digital still cameras (DSC), or other portable devices. The viewing angle property is a problem for the liquid crystal display device. The viewing angle property is a phenomenon that the brightness or the chromaticity varies when the screen is viewed from the front and from an oblique angle. The viewing angle property is excellent in the in-plane switching (IPS) mode for operating the liquid crystal molecules by the electric field in the parallel direction.

There are various types in the IPS mode. Japanese Unexamined Patent Application Publication No. 2004-302448 describes a structure of an IPS mode liquid crystal display device with pixel and counter electrodes having a comb-like shape, in which an organic insulating film is formed on video signal lines in order to reduce the parasitic capacitance between the video signal lines and the upper electrode (which may be the pixel electrode or may be the counter electrode).

Japanese Unexamined Patent Application Publication No. Hei 09(1997)-105918 describes, for example, a method for forming a common electrode in a matted manner, disposing a comb-like pixel electrode on the common electrode with an insulating film interposed therebetween, and rotating liquid crystal molecules by an electric field generated between the pixel electrode and the common electrode. This method has the property of being able to increase the transmittance.

SUMMARY OF THE INVENTION

FIG. 11 is a plan view of a pixel of IPS mode, which is the one that is currently the mainstream. This is a plan view of a pixel portion in which a counter electrode 108 is formed in a matted manner on the lower layer, and a pixel electrode 111 with a slot 1111 is formed on the counter electrode 108 with an insulating film interposed therebetween. Then, the liquid crystal molecules are rotated by a lateral electric field generated in the slit portion 1111 or in the periphery of the pixel electrode 111. FIG. 12 is a cross-sectional view taken along line D-D of FIG. 1.

In FIG. 11, the pixel is surrounded by video signal lines 50 and scanning lines 40. In FIG. 11, a semiconductor layer 102 is formed of poly-Si on the bottom layer. The semiconductor layer 102 crosses below the scanning line 40 twice. Thus, in FIG. 11, a first TFT is formed on the left side, namely, on the lower side of the video signal line 50, and a second TFT is formed on the right side of the first TFT. A first through hole 10 for connecting the first TFT to the video signal line 50 is formed in the portion of the semiconductor layer 102 with a wide width, which serves as a drain electrode of the first TFT. The source portion of the first TFT and the drain portion of the second TFT are common. The source of the second TFT has a wide width and is connected to a source electrode 106 in this portion through a second through hole 20.

The source electrode 106 is connected to the pixel electrode 111 by a third through hole 30. The pixel electrode 111 has a rectangular shape with the slit 1111 inside. When a video signal is applied to the pixel electrode 111, the liquid crystal is rotated by the lateral electric field component of the lines of electric force that is generated between the pixel electrode 111 and the lower counter electrode 108 in the outer periphery of the pixel electrode 111 and the slit portion 1111, to control the transmittance of light from the backlight in the pixel. Note that the counter electrode 108 is formed in the entire surface of the pixel, but is not formed in the second through hole 20, the third through hole 30, the source electrode 106, the pixel electrode 111, and the connection area of the pixel electrode 111 and the source electrode 106. This portion is a counter electrode removal portion 1082.

FIG. 12 is a cross-sectional view taken along line D-D of FIG. 11. In FIG. 12, a base film 101 is formed on the TFT substrate 100, in order to prevent impurities from the glass substrate from contaminating the semiconductor layer 102. In general, the base film 101 is formed by two layers of an SiN film and an SiO$_2$ film. However, in FIG. 12, the base film 101 has a single layer of an SiN film or an SiO$_2$ film. The semiconductor layer 102 is formed on the base film 101. The semiconductor layer is formed of poly-Si. A gate insulating film 103 of tetraethoxysilane (TEOS), and the like, is formed on the semiconductor layer. Then, a gate electrode 104 is formed on the gate insulating film 103. The scanning line 40 is also used as the gate electrode 104.

In the semiconductor layer 102, the region on the lower side of the gate electrode 104 is a channel. The region other than the gate electrode 104 is doped with impurities to form a conductor. The TFT in FIG. 12 shows the second TFT in FIG. 11. A first interlayer insulating film 105 is formed of SiN and covers the gate electrode 104. Then, the source electrode 106 is formed on the first interlayer insulating film 105. The source electrode 106 is formed at the same time and in the same layer as the video signal lines 50.

The source electrode 106 is connected to the source portion of the TFT by the second through hole 20 formed in the gate insulating film 103 and the first interlayer insulating film 105. An organic passivation film 109 is formed so as to cover the first interlayer insulating film 105 and the source electrode 106. The organic passivation film 109 is also used for a flattering film, and is thick with a thickness of about 1.5 to 2 μm. The counter electrode 108 is formed of indium tin oxide (ITO) in a matted manner on the organic passivation film 109. A second interlayer insulating film 110 is formed of SiN, and the like, on the counter electrode 108.

The third through hole 30 is formed in the organic passivation film 109 and the second interlayer insulating film 110. Then, the pixel electrode 111 is formed so as to cover the through hole 30. The pixel electrode 111 has a rectangular shape with the slit 1111 inside as shown in FIG. 11. This type of IPS controls the transmittance by rotating the liquid crystal in the edge portion of the pixel electrode 111. As a result, the transmittance of the pixel can be increased by the formation of the slit 1111. Note that an alignment film, which is formed on the pixel electrode 111, is omitted in FIG. 12.

In FIG. 11, the electric field is irregular in the end portion of the pixel electrode 111, namely, in the P portion surrounded by the dashed line. As a result, a phenomenon that the liquid crystal is reversely rotated due to an abnormality in the electric field direction between electrodes with respect to the initial alignment direction of the liquid crystal, in other words, a so-called domain occurs. Further, the propagation in the pixel occurs in this portion when the liquid crystal display panel is pushed. In other words, a so-called push domain occurs. This domain causes degradation of the contrast of the image. Hereinafter, the domain and the push domain are collectively referred to as the domain.

Further, in the small liquid crystal display device, there is also a problem that the width of the rectangular pixel electrode 111 may not be large enough to have the slit 111 inside due to the reduction in the size of the pixel. In this case, the pixel electrode 111 has a vertically long simple rectangular shape. In the pixel electrode 111 having such a shape, the occurrence of the domain is more significant.

An object of the present invention is to achieve a structure for preventing the occurrence of the domain in an IPS mode liquid crystal display device with a high definition screen.

The present invention is made to solve the above problems, specific means are as follows.

(1) A liquid crystal display device includes a TFT substrate, a counter electrode, and a liquid crystal interposed between the TFT substrate and the counter substrate. In the TFT substrate, a pixel is present in a region surround by scanning lines extending in a first direction and arranged in a second direction, and by video signal lines extending in the second direction and arranged in the first direction. In the pixel, a counter electrode is formed flat on a first insulting film. A second insulating film is formed in the peripheral portion of the counter electrode. A third insulating film is formed so as to cover the counter electrode and the second insulting film. A pixel electrode is formed on the third insulating film. The second insulating film and third insulating film are present between the pixel electrode and the counter electrode in the peripheral portion of the pixel. Then, only the third insulating film is present between the pixel electrode and the counter electrode in the portion other than the peripheral portion of the pixel.

(2) A liquid crystal display device includes a TFT substrate, a counter substrate, and a liquid crystal interposed between the TFT substrate and the counter substrate. In the TFT substrate, a pixel is present in a region surrounded by scanning lines extending in a first direction and arranged in a second direction, and by video signal lines extending in the second direction and arranged in the first direction. In the pixel, a pixel electrode is formed flat on a first insulting film. A second insulating film is formed in the peripheral portion of the pixel electrode. A third insulating film is formed so as to cover the pixel electrode and the second insulating film. A counter electrode with a slit is formed on the third insulating film. An end portion of the slit extends along the peripheral portion of the pixel. The second and third insulating films are present between the pixel electrode and the counter electrode in the peripheral portion of the pixel. Then, only the third insulating film is present between the pixel electrode and the counter electrode in the portion other than the peripheral portion of the pixel.

(3) A liquid crystal display device includes a TFT substrate, a counter substrate, and a liquid crystal interposed between the TFT substrate and the counter substrate. In the TFT substrate, a pixel is present in a region surrounded by scanning lines extending in a first direction and arranged in a second direction, and by video signal lines extending in the second direction and arranged in the first direction. In the pixel, a counter electrode is formed flat on a first insulating film. A second insulating film is formed so as to cover the counter electrode. An organic insulating film is formed on the second insulating film in the peripheral portion of the pixel. A pixel electrode is formed on the second insulating film. Then, the second insulating film and the organic insulating film are present between the pixel electrode and the counter electrode in the peripheral portion of the pixel.

(4) A liquid crystal display device includes a TFT substrate, a counter substrate, and a liquid crystal interposed between the TFT substrate and the counter substrate. In the TFT substrate, a pixel is present in a region surrounded by scanning lines extending in a first direction and arrange in a second direction, and by video signal lines extending in the second direction and arranged in the first direction. In the pixel, a pixel electrode is formed flat on a first insulating film. A second insulating film is formed so as to cover the pixel electrode. An organic insulating film is formed on the second insulating film in the peripheral portion of the pixel. A counter electrode with a slit is formed on the second insulating film. An end portion of the slit of the counter electrode extends along the peripheral portion of the pixel. The second insulating film and the organic insulating film are present between the pixel electrode and the counter electrode in the peripheral portion of the pixel. Then, only the second insulating film is present between the pixel electrode and the counter electrode in the portion other than the peripheral portion of the pixel.

According to the present invention, it is possible to prevent the occurrence of a domain in a liquid crystal display device with small pixels, or high definition. As a result, it is possible to provide a liquid crystal display device with excellent contrast.

DETAILED DESCRIPTION

Figure 1:
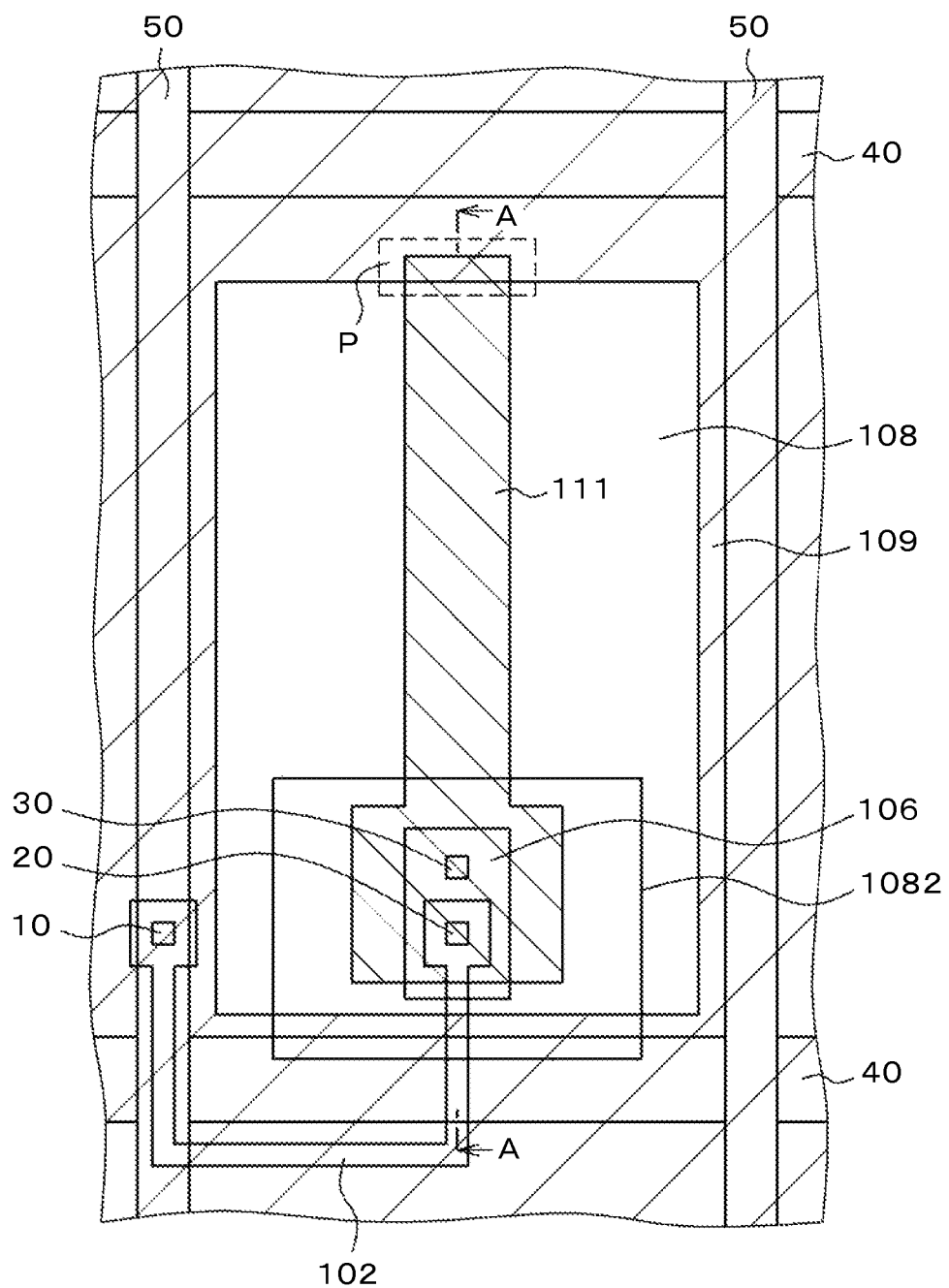
FIG. 1 is a plan view of a first embodiment.
Figure 13:
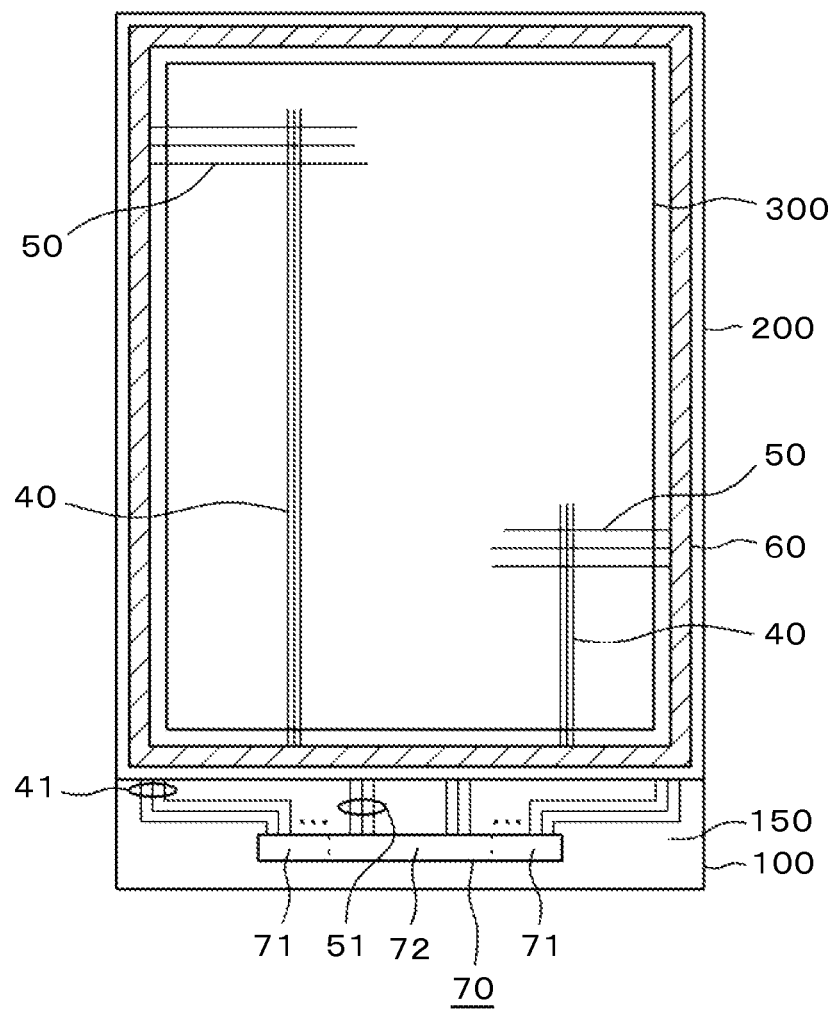
FIG. 13 is a plan view of an example of a liquid crystal display device to which the present invention is applied.

FIG. 13 is a plan view of a small liquid crystal display device used in mobile phones or other devices, which is an example of a product to which the present invention is applied. In FIG. 13, a counter substrate 200 is provided on a TFT substrate 100. A liquid crystal layer, not shown, is interposed between the TFT substrate 100 and the counter substrate 200. The TFT substrate 100 and the counter substrate 200 are bonded with a sealing material 20 formed in the frame portion. In FIG. 1, a liquid crystal is injected by a droplet injection method, so that an injection hole is not formed.

The TFT substrate 100 is made larger than the counter substrate 200. A terminal portion 150 is formed in a portion of the TFT substrate 100 sticking out of the counter substrate 200. The terminal portion 150 supplies power, video signals, scanning signals, and the like, to a liquid crystal cell 1.

Further, an IC driver 70 for driving the scanning lines 40, the video signal lines 50, and the like, is formed in the terminal portion 150. The IC driver is divided into three regions, in which a video signal driving circuit 72 is provided in the center, and scanning signal driving circuits 71 are provided on the both sides of the central portion.

In FIG. 1, the scanning signal lines 40 extending in the horizontal direction are arranged in the vertical direction in a display area 300. Further, the video signal lines 50 extending in the vertical direction are arranged in the horizontal direction. The region surrounded by the scanning signal lines 40 and the video signal lines 50 is a pixel. The scanning lines are connected to the scanning signal driving circuits 71 of the IC driver 70 by scanning-line lead lines 41 from the both sides of the display area 300. Video signal line lead lines 51 connecting the video signal lines 50 and the IC driver 70 are gathered on the lower side of the screen, and are connected to the video signal driving circuit 72 provided in the central portion of the IC driver 70.

The present invention relates to a structure of a pixel portion surrounded by scanning lines and video signal lines. Hereinafter, the details of the present invention will be described with reference to the preferred embodiments.

First Embodiment

Figure 2:
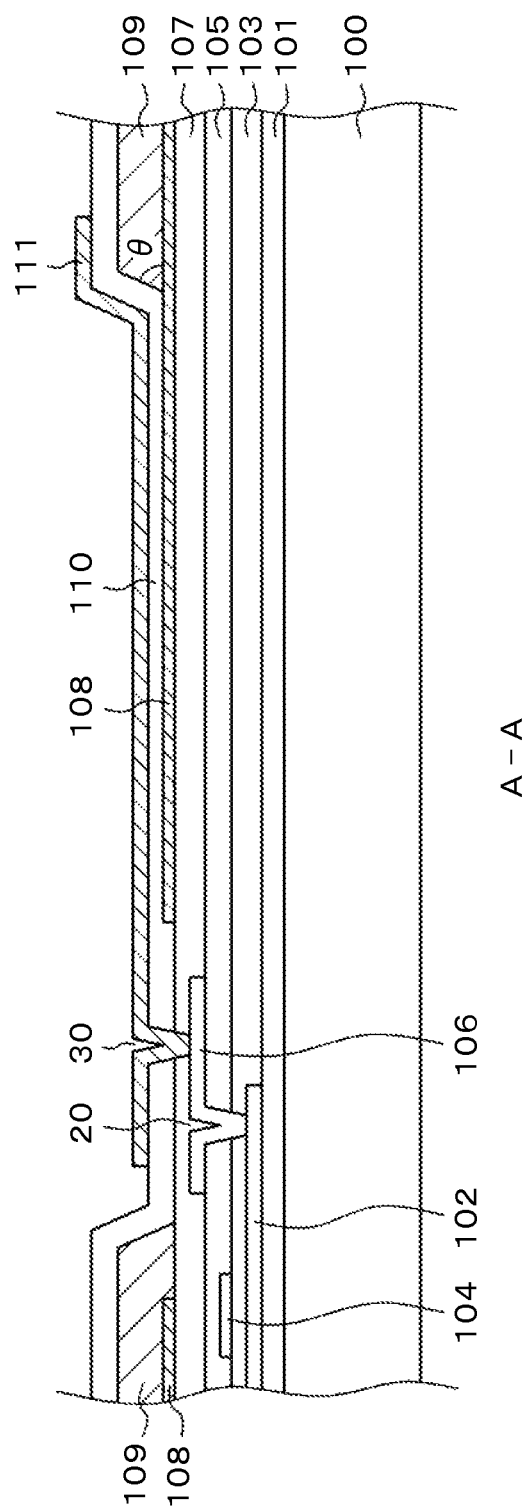
FIG. 2 is a cross-sectional view taken along line A-A of FIG. 1.
Figure 11:
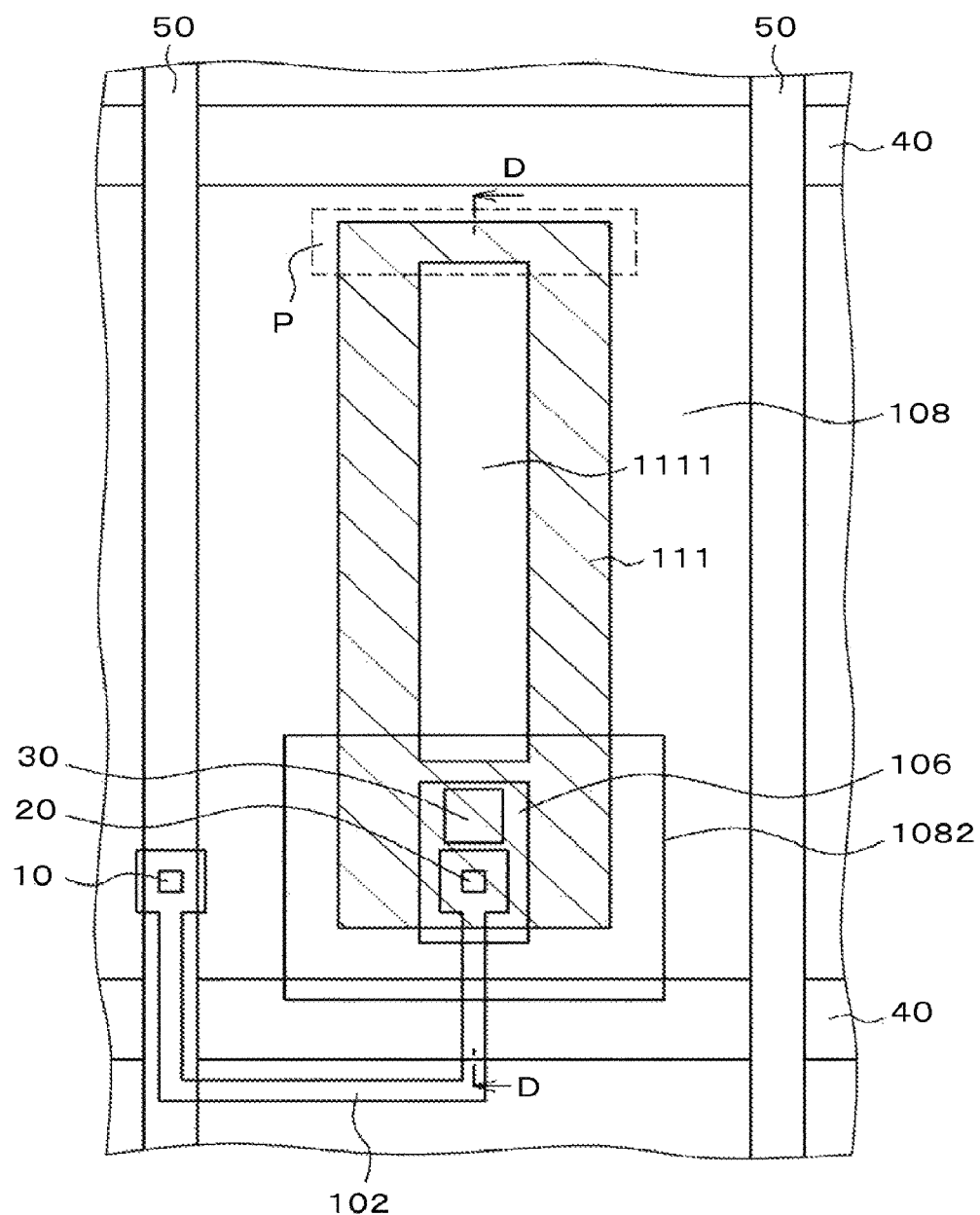
FIG. 11 is a plan view of a conventional example.

FIG. 1 is a plan view of a pixel structure according to a first embodiment. FIG. 2 is a cross-sectional view taken along line A-A of FIG. 1. FIG. 1 is the same as FIG. 11 in which the semiconductor layer 102 is formed of poly-Si between the video signal lines 50 and the source electrode 106, a first TFT is formed using the scanning line 40 as a gate electrode on the left side below the video signal line 50, and a second TFT is formed and connected to the first TFT in series. The region of the semiconductor layer 102 below the scanning line 40 is a channel portion, and the other region is doped with impurities to form a conductor. The video signal line 50 is connected to the first TFT through the first through hole 10. Then, the source electrode 106 is connected to the second TFT through the second through hole 20.

The pixel electrode 111 is connected to the source electrode 106 through the third through hole 30. In the present embodiment, the pixel electrode 111 has a long rectangular shape with no slit present inside the pixel electrode 111. In other words, the area occupied by the pixel electrode 111 is limited as the size of the pixel is reduced, making it difficult to provide a space for forming the pixel electrode 111 with the slit 1111 inside, or forming the comb-like pixel electrode inside. As a result, the pixel electrode 111 is formed as shown in FIG. 1. The counter electrode 108 is formed flat below the pixel electrode 111 through the second interlayer insulating film not shown. The pixel electrode 111 and the counter electrode 108 are formed of a transparent conductive film such as indium tin oxide (ITO). This is the same in the following embodiments.

In the periphery of the long rectangular pixel electrode 111 as shown in FIG. 1, the liquid crystal molecules rotate by a lateral electric field to control the transmittance of the pixel. In the pixel electrode 111 having such a shape, a domain is likely to occur in the end portion of the pixel electrode 111, namely, in the P portion surrounded by the dashed line in FIG. 1.

In order to prevent this, the present invention provides a structure for removing the inside of the organic passivation film 109, while the peripheral portion of the pixel left unremoved. The pixel electrode 111 is formed on the organic passivation film 109 and the second interlayer insulting film 110 at the end of the pixel electrode 111. The counter electrode 108 is formed on the lower side of the organic passivation film 109. Because of this structure, the gap between the pixel electrode 111 and the counter electrode 108 is increased at the end of the pixel electrode 111. The electric field between the pixel electrode 111 and the counter electrode 108 is reduced. Then, the force to reversely rotate the liquid crystal molecules against the initial alignment direction is reduced. As a result, it is possible to prevent the occurrence of the domain.

FIG. 2 is a cross-sectional view taken along line A-A of FIG. 1. FIG. 2 is the same as FIG. 12 until the formation of the second through hole 20 in the gate insulating film 103 and the first interlayer insulating film 105 to connect the source electrode 106 and the second TFT source portion. In FIG. 2, an inorganic passivation film 107 of SiN and the like is formed so as to cover the source electrode 106 and the first interlayer insulating film 105. Then, the counter electrode 108 of ITO is formed flat on the inorganic passivation film 107.

Figure 12:
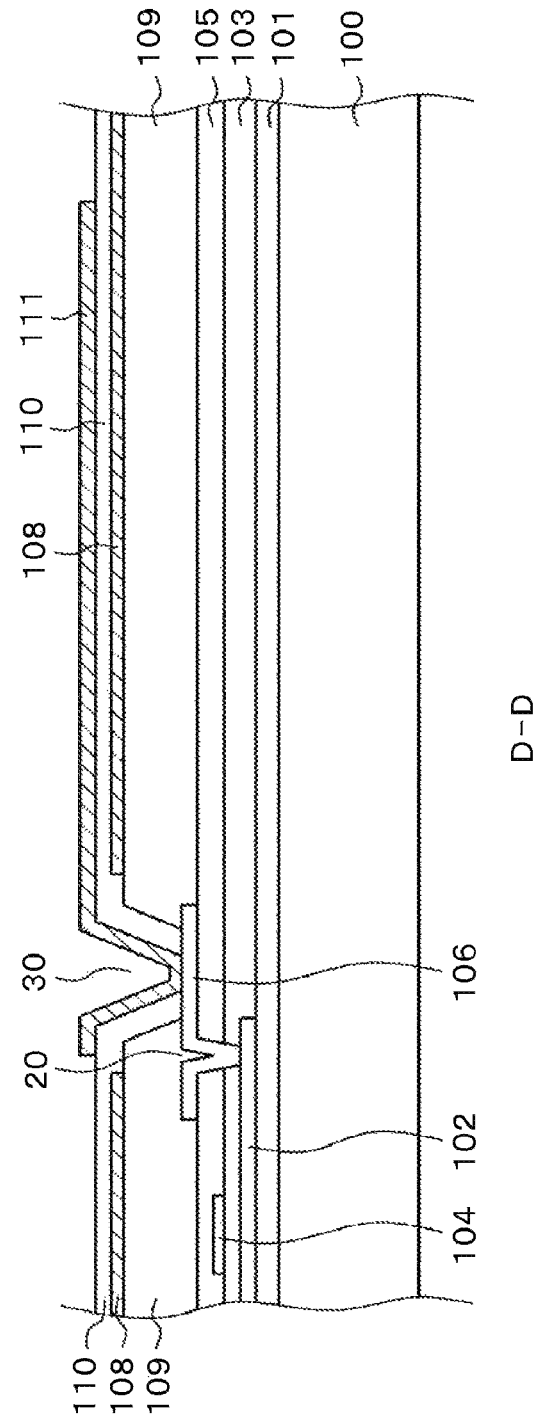
FIG. 12 is a cross-sectional view taken along line D-D of FIG. 11.

FIG. 2 is different from FIG. 12 in that the organic passivation film 109 is formed on the counter electrode 108. Further, the important feature of the present embodiment is that the organic passivation film 109 is removed in the most part inside the pixel, except the periphery of the pixel. The second interlayer insulating film 110 is formed of SiN or the like, and covers the organic passivation film 109 and the counter electrode 108. Then, the pixel electrode 111 is connected to the source electrode 106 through the third through hole 30, which is formed in the second interlayer film 110 and the inorganic passivation film 107. Note that an alignment film formed on the pixel electrode is omitted in FIG. 2. This is the same as in FIGS. 6, 8, 9, and 10.

Because of this structure, the gap between the pixel electrode 111 and the counter electrode 108 is larger in the vicinity of the end of the pixel electrode 111 than in the other parts, by the film thickness of the organic passivation film 109. In other words, the electric field between the pixel electrode 111 and the counter electrode 108 is reduced by the film thickness of the organic passivation film 109. As a result, it is possible to prevent the occurrence of the so-called domain, which is a phenomenon that the liquid crystal molecules rotate in the reverse direction to the initial alignment direction. In FIG. 2, the end portion of the pixel electrode rides over the flat portion of the organic passivation film 109. However, it is also possible to form the pixel electrode only in the inclined portion of the organic passivation film 109, without the end portion of the pixel electrode riding over the flat portion of the organic passivation film 109. Note that the inclination angle at the end of the organic passivation film 109 is about 40 to 80 degrees.

Figure 3:
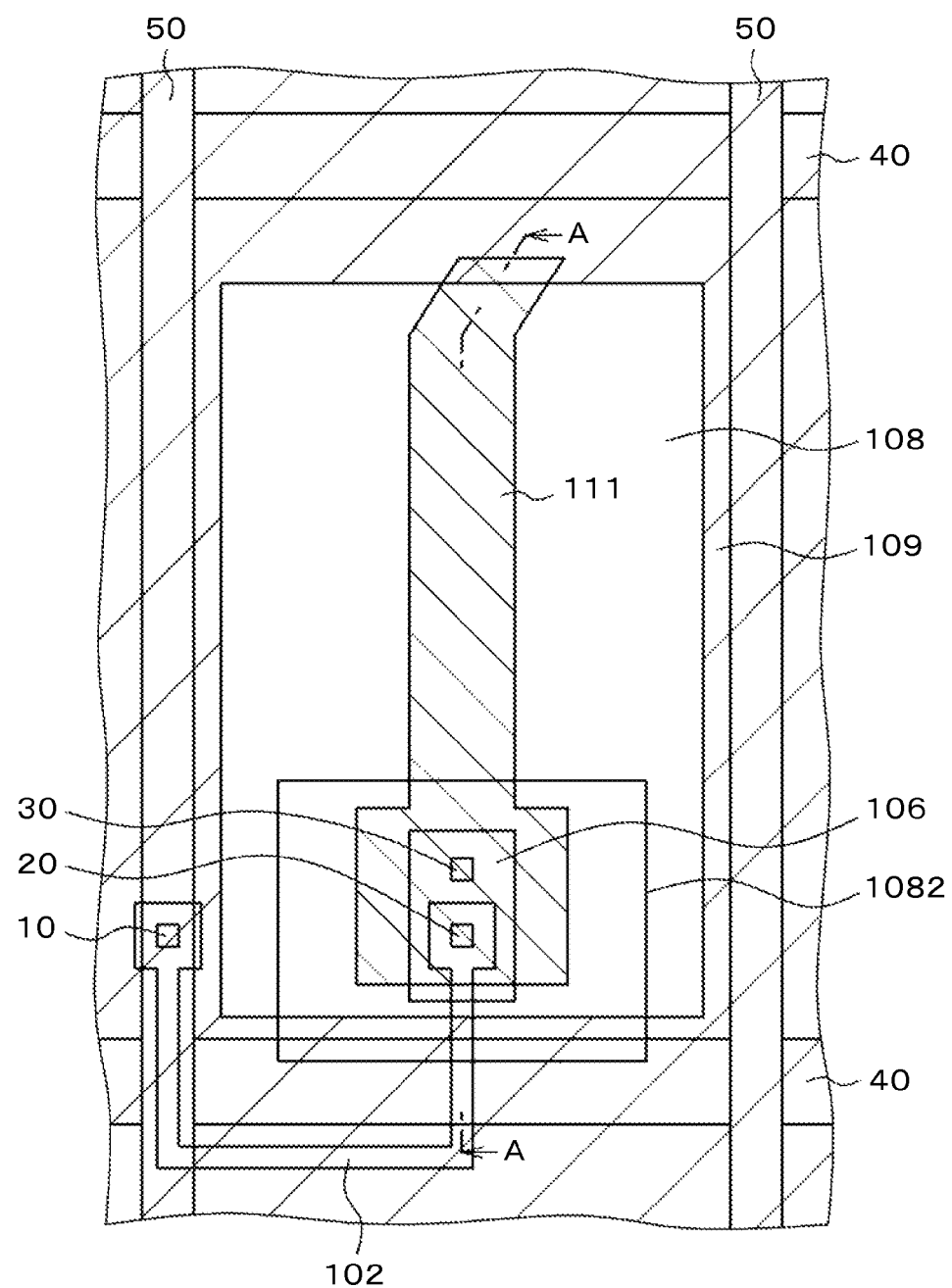
FIG. 3 is a plan view of another aspect of the first embodiment.

FIG. 3 is a plan view of a variation of the present embodiment. The A-A cross section of FIG. 3 is the same as the A-A cross section of FIG. 1. FIG. 3 is different from FIG. 1 in that the end of the pixel electrode 111 is bent to the right side. In this way, it is also possible to prevent the occurrence of the domain by bending the end of the pixel electrode 111. Further, in the structure in FIG. 3, the gap between the pixel electrode 111 and the counter electrode 108 is increased by interposing the organic passivation film 109 therebetween in the vicinity of the end of the pixel electrode 111 as shown in FIG. 2. In this way, it is possible to prevent the occurrence of the domain by reducing the electric field between the pixel electrode 111 and the counter electrode 108, which has been described with reference to FIG. 2.

Figure 4:
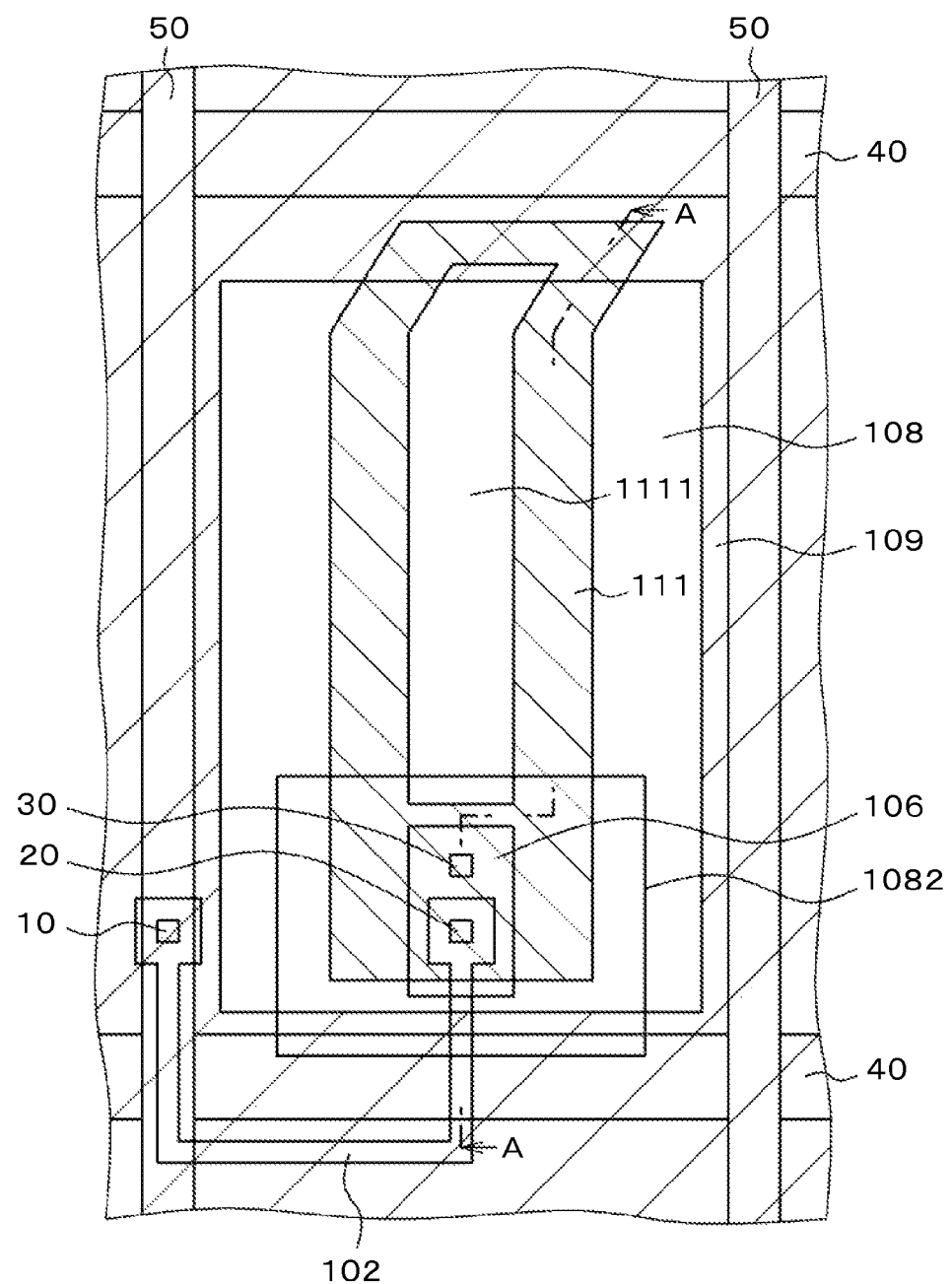
FIG. 4 is a plan view of still another aspect of the first embodiment.

FIG. 4 is a plan view of another variation of the present embodiment. The A-A cross section of FIG. 4 is the same as FIG. 2. FIG. 4 is different from FIG. 3 in that the width of the pixel electrode 111 is large and the slit 1111 is formed inside of the pixel electrode 111. The pixel electrode 111 having such a structure is used for a pixel with a width greater than the width of the pixels shown in FIG. 1, FIG. 3 or others.

Also in the case of the pixel electrode 111 shown in FIG. 4, the gap between the pixel electrode 111 and the counter electrode 108 is increased by interposing the organic passivation film 109 therebetween in the vicinity of the end of the pixel electrode 111 as shown in FIG. 2, which shows the A-A cross section of FIG. 4. In this way, it is possible to prevent the occurrence of the domain by reducing the electric field between the pixel electrode 111 and the counter electrode 108.

Second Embodiment

Figure 5:
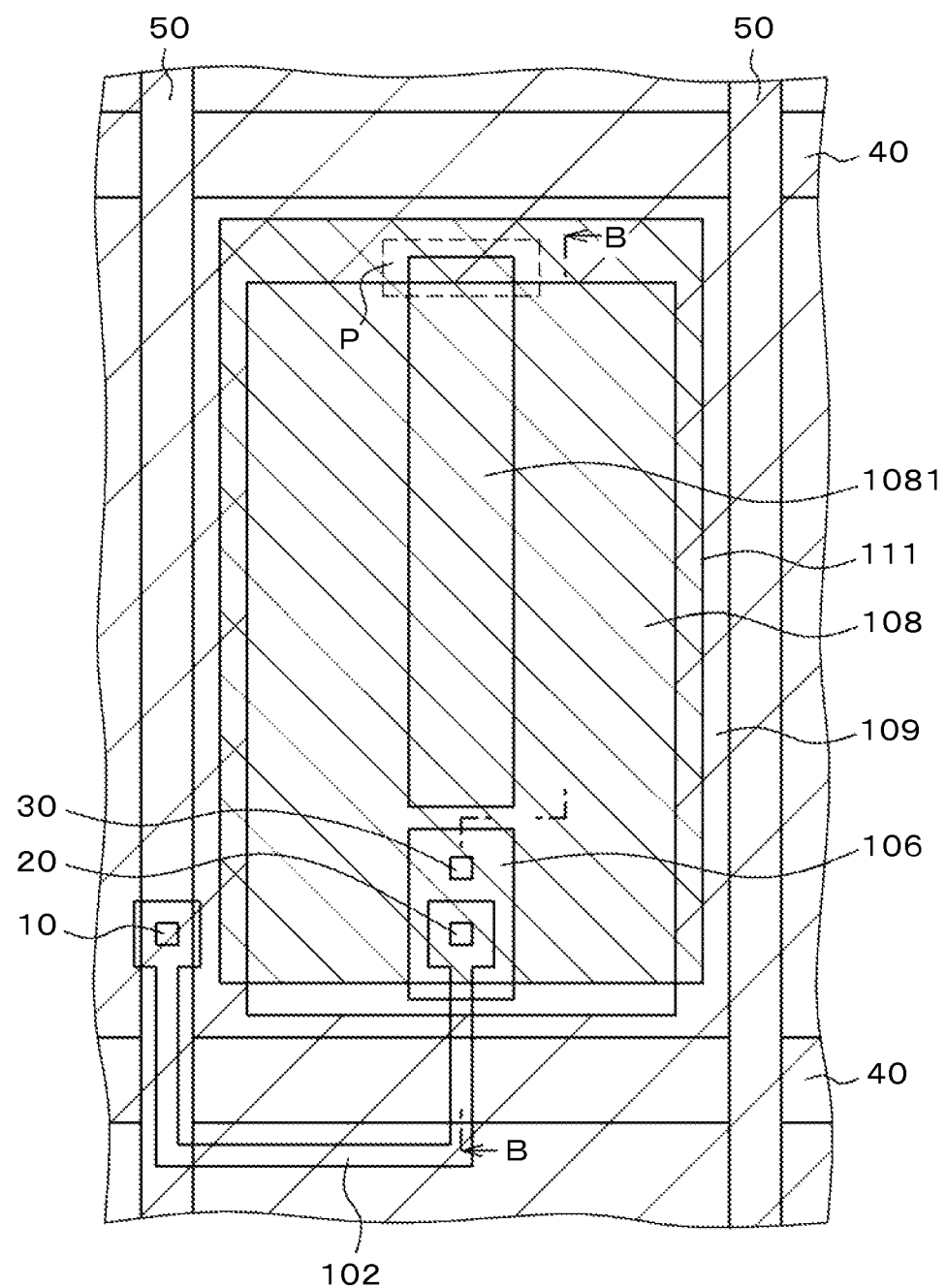
FIG. 5 is a plan view of a second embodiment.
Figure 6:
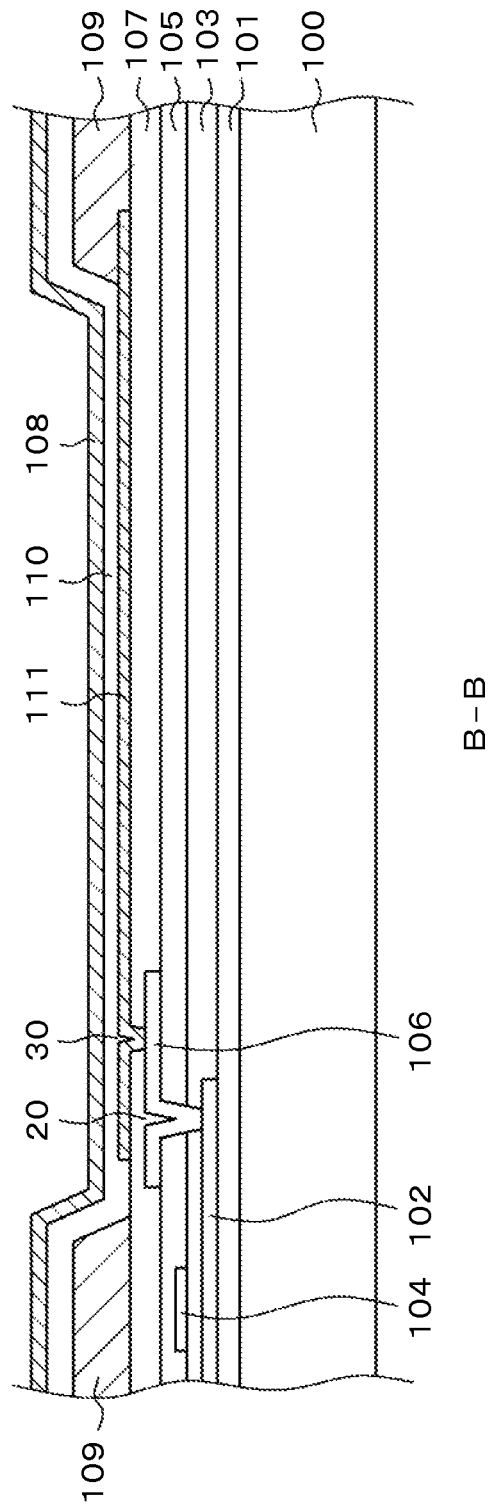
FIG. 6 is a cross-sectional view taken along line B-B of FIG. 5.

FIG. 5 is a plan view of the pixel portion, which shows a second embodiment of the present invention. FIG. 6 is a cross-sectional view taken along line B-B of FIG. 5. The present embodiment is different from the first embodiment in that the first electrode formed flat on the lower layer is used as the pixel electrode 111, and that the second electrode on the upper layer with the second interlayer insulating film 110 therebetween is used as the counter electrode 108 with a slit 1081.

FIG. 5 is the same as the first embodiment in which the organic passivation film 109 is removed in the pixel surrounded by the scanning lines 40 and the video signal lines 50, except the periphery of the pixel. In FIG. 5, the pixel electrode 111 marked by diagonal lines is formed flat in the pixel. The peripheral portion of the counter electrode 108 rides over the organic passivation film 109 marked by diagonal lines, which is formed in the vicinity of the pixel. In FIG. 5, the source portion of the second TFT is connected to the source electrode 106 through the second through hole 20. Further, the source electrode 106 is connected to the pixel electrode 111 through the third through hole 30.

In FIG. 5, the counter electrode 108 with the slit 1081 covers the pixel electrode 111, the scanning lines 40, the video signal lines 50, and the like, through the second interlayer insulating film 110 not shown. In other words, the counter electrode 108 covers the entire surface except the slit portion 1081. When a video signal is applied to the pixel electrode 111 on the lower layer, lines of electric force are generated through the slit 1081 between the pixel electrode 111 and the counter electrode 108. The transmittance of the pixel is controlled by rotating the liquid crystal molecules by the lateral component of the lines of electric force.

FIG. 6 is a cross-sectional view taken along line B-B of FIG. 5. FIG. 6 is the same as FIG. 2 of the first embodiment until the formation of the source electrode 106. In FIG. 6, the inorganic passivation film 107 is formed so as to cover the first interlayer insulating film 105 and the source electrode 106. Then, the pixel electrode 111, which is the first electrode, is formed flat on the inorganic passivation film 107. The pixel electrode 111 and the source electrode 106 are connected to each other through the third through hole 30 formed in the inorganic passivation film 107.

In FIG. 6, the organic passivation film 109 is formed on the pixel electrode 111 and the inorganic passivation film 107. The organic passivation film 109 is removed except the peripheral portion of the pixel. The second interlayer insulating film 110 is formed so as to cover the organic passivation film 109 and the pixel electrode 111. In FIG. 6, there is no through hole formed in the second interlayer insulating film 110. The counter electrode 108 is connected to the common line in a portion other than the portion of the pixel shown in FIG. 6.

Also in the present embodiment, it is possible to increase the gap between the pixel electrode 111 and the counter electrode 108 in the periphery of the pixel. Thus, it is possible to prevent the occurrence of the domain in the end portion of the slit 1081 of the counter electrode 108, which is the region P indicated by the dashed line in FIG. 5. Further, in FIG. 5, the counter electrode 108, which is formed in the entire surface, and the video signal lines 50 are laminated through the organic passivation film 109 in addition to through the second interlayer insulating film 110. Thus, it is possible to increase the distance between the video signal lines 50 and the counter electrode 108. As a result, the capacity of the video signal lines 50 and the counter electrode 108 can be reduced.

The slit 1081 formed in the counter electrode 108 shown in FIG. 5 has a long rectangular shape. The end portion of the slit 1081 may be bent in one direction similarly to the pixel electrode 111 shown in FIG. 3. In this case, the organic passivation film 109 and the second interlayer insulating film 110 are present between the counter electrode 108 and the pixel electrode 111 at the position in which the slit 1081 is bent. Further, one slit 1081 is formed in the counter electrode 108 in FIG. 5, but multiple slits 1081 can be formed.

Third Embodiment

Figure 7:
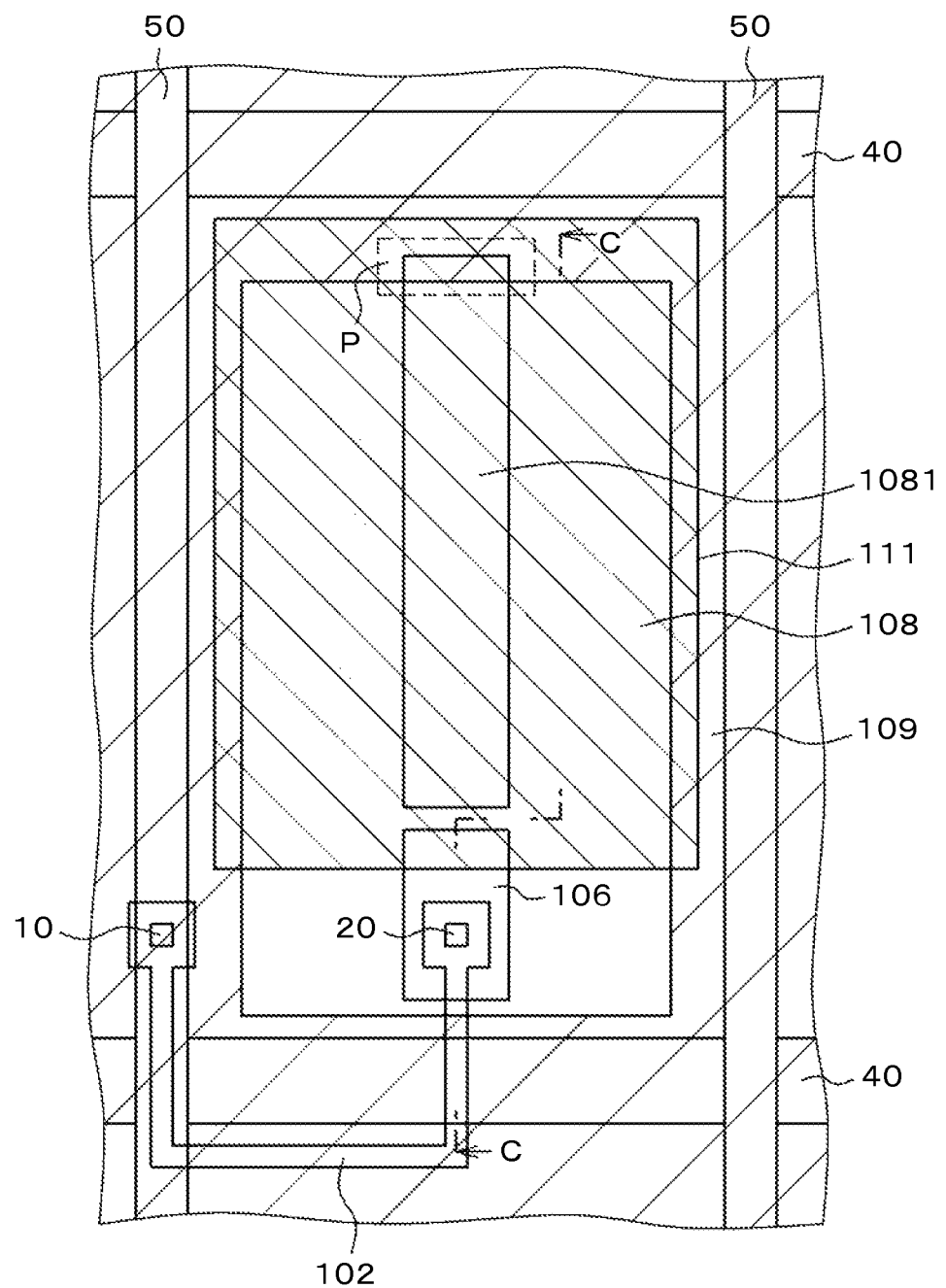
FIG. 7 is a plan view of a third embodiment.
Figure 8:
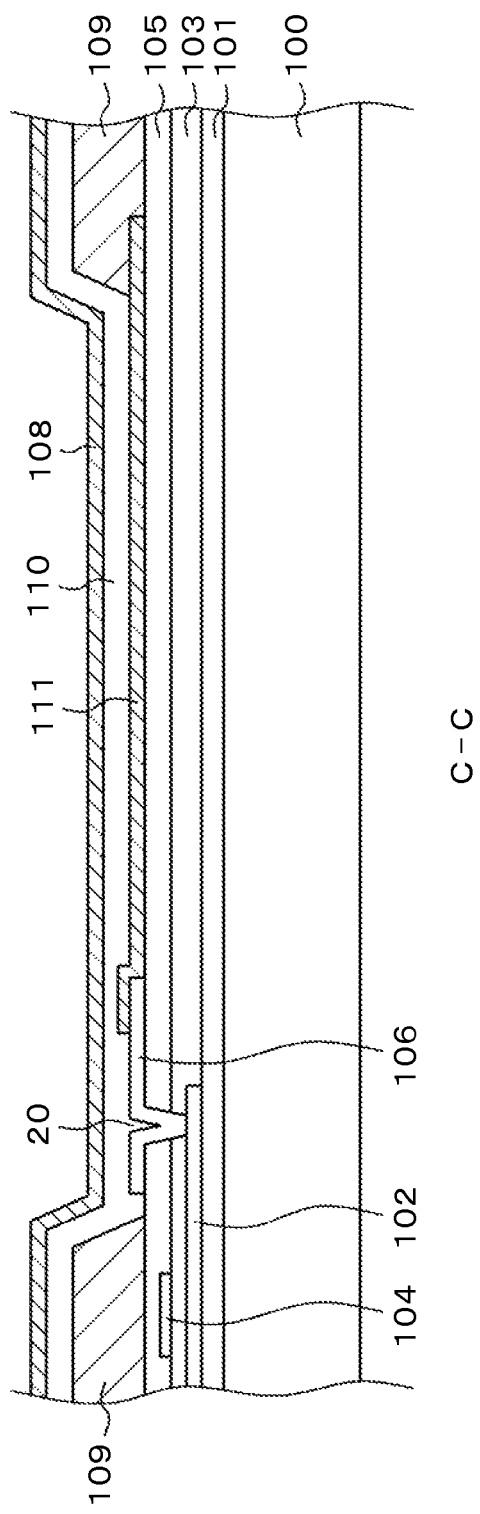
FIG. 8 is a cross-sectional view taken along line C-C of FIG. 7.

FIG. 7 is a plan view of a third embodiment of the present invention. FIG. 8 is a cross-sectional view taken along line C-C of FIG. 7. The third embodiment is different from the second embodiment in that the inorganic passivation film 107 shown in FIG. 6 of the second embodiment is not present, and that the pixel electrode 111 and the source electrode 106 are formed on the same first interlayer insulating film 105. Thus, the third through hole is not present in FIGS. 7 and 8. The source electrode 106 and a portion of the pixel electrode 111 overlap to establish electrical conductivity. The other structures are the same as the second embodiment.

In other words, in FIG. 7, the organic passivation film 109 marked by diagonal lines is present in the vicinity of the rectangular pixel electrode 111 marked by diagonal lines. Then, the counter electrode 108 with the slit 1081 covers the entire electrode. FIG. 8 is a cross-sectional view taken along line C-C of FIG. 7. FIG. 8 is the same as the second embodiment until the source electrode 106 and the source portion of the semiconductor layer 102 are connected by the second through hole 20. In the present embodiment, the inorganic passivation film 107 is not formed on the source electrode 106. The source electrode 106 and the pixel electrode 111 are formed on the same interlayer insulating film 105. At this time, the source electrode 106 and a portion of the pixel electrode 111 overlap to connect the source electrode 106 and the pixel electrode 111 to each other. Thus, the third through hole is not present in this embodiment.

As shown in FIG. 8, the counter electrode 108 faces the pixel electrode 111 through the organic passivation film 109 and the second interlayer insulating film 110 in the end portion of the pixel electrode 111. Thus, the gap between the pixel electrode 111 and the counter electrode 108 can be reduced. As a result, it is possible to prevent the occurrence of the domain in the region P surrounded by the dashed line in FIG. 7.

Further, also in the present embodiment, the counter electrode 108, which is formed in the entire surface, and the video signal lines 50 are laminated through the organic passivation film 109 and the second interlayer insulating film 110. Thus, it is possible to reduce the capacity of the video signal lines 50 and the counter electrode 108. Note that the pixel electrode 111 is formed on the source electrode 106 in FIG. 8, but it is also possible that the pixel electrode 111 is first formed and then a portion of the source electrode 106 is laminated on the pixel electrode 111.

Fourth Embodiment

Figure 9:
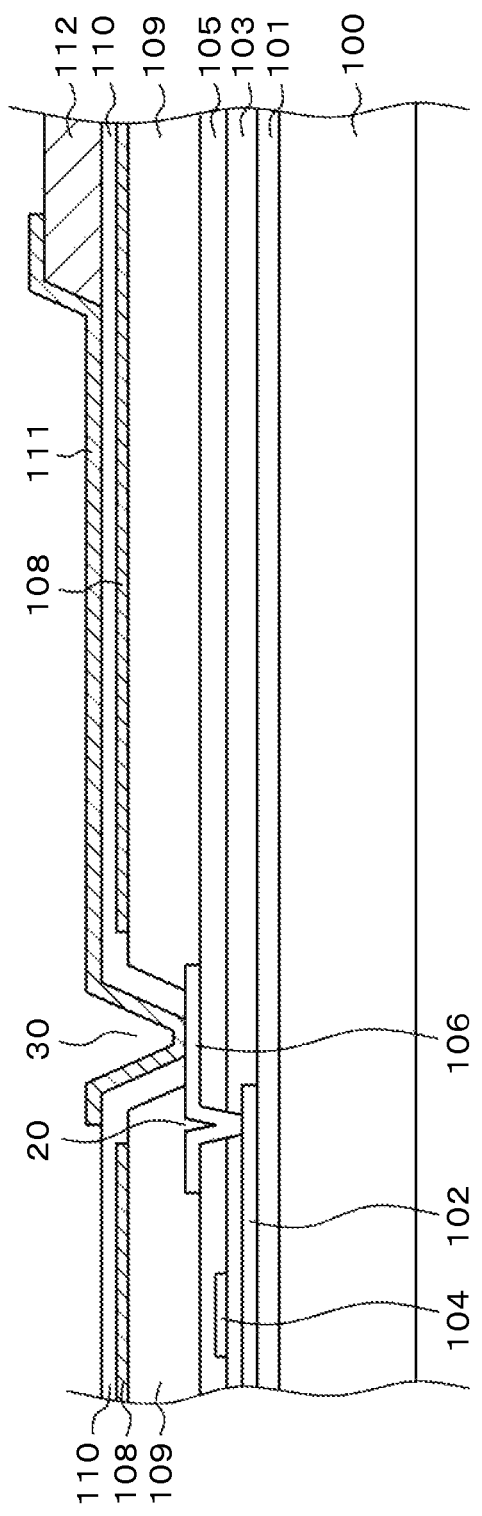
FIG. 9 is a cross-sectional view of a fourth embodiment.

FIG. 9 is a cross-sectional view of a fourth embodiment of the present invention. The structure of FIG. 9 is the same as FIG. 12, which shows the conventional example, until the formation of the second interlayer insulating film 110. The feature of FIG. 9 is that the organic insulating film 112 is formed on the second interlayer insulating film 110 only in the peripheral portion of the pixel. The organic insulating film 112 can be formed of the same material as the organic passivation film 109, with the same film thickness as the organic passivation film 109. However, the film thickness can be set to any value as needed.

Then, the pixel electrode 111 is formed. The end of the pixel electrode 111 rides over the organic insulating film 112 formed in the vicinity of the pixel. The distance between the pixel electrode 111 and the counter electrode 108 is increased in this portion. Thus, the distance between the pixel electrode 111 and the counter electrode 108 is increased and the electric field between the pixel electrode 111 and the counter electrode 108 is reduced. As a result, it is possible to prevent the occurrence of the domain at the end of the pixel electrode 111 as described in the first embodiment and other embodiments. Note that FIG. 9 is the same as FIG. 12 in which the pixel electrode 111 is connected to the source electrode 106 through the third through hole 30. The planar shape of the pixel electrode 111 can be any one of the shapes shown in FIGS. 1, 3, and 4 in the first embodiment.

Fifth Embodiment

Figure 10:
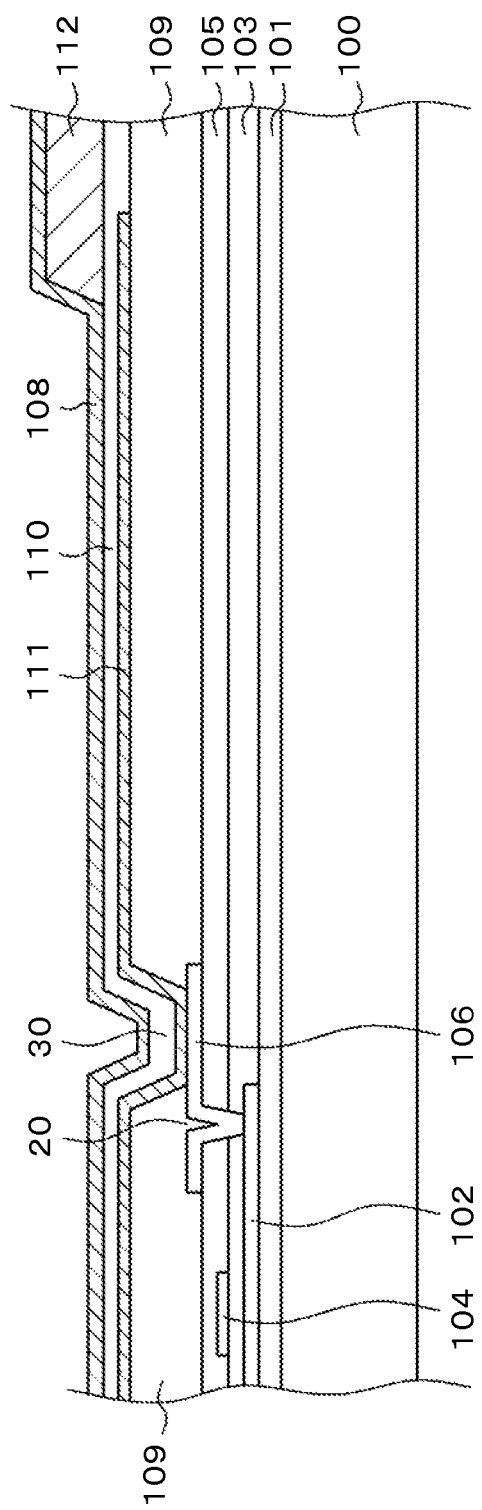
FIG. 10 is a cross-sectional view of a fifth embodiment.

FIG. 10 is a cross-sectional view of a fifth embodiment of the present invention. FIG. 10 is different from FIG. 9 of the fourth embodiment in that the first transparent electrode formed on the organic passivation film 109 serves as the pixel electrode 111, and that the second transparent electrode formed on the second interlayer insulating film 110 serves as the counter electrode 108. FIG. 10 is the same as FIG. 9 until the formation of the organic passivation film 109.

In FIG. 10, the pixel electrode 111 is formed on the organic passivation film 109. The pixel electrode 111 is connected to the source electrode 106 through the third through hole 30 formed in the organic passivation film 109. Then, the second interlayer insulating film 110 is formed on the pixel electrode 111. Then, similarly to the fourth embodiment, the organic insulating film 112 is formed on the second interlayer insulating film 110 in the peripheral portion of the pixel. The organic passivation film 112 can be formed of the same material as the organic passivation film 109, with the same film thickness as the organic passivation film 109. However, the film thickness of the organic insulating film 112 can be set as appropriate.

Then, the counter electrode 108 with the slit 1081 is formed. The counter electrode 108 and the pixel electrode 111 face each other through the second interlayer insulating film 110, except the peripheral portion of the pixel. However, the counter electrode 108, including the end portion of the slit 1081, faces the pixel electrode 111 through the second interlayer insulating film 110 and the organic insulating film 109, in the peripheral portion of the pixel. Thus, the gap between the counter electrode 108 and the pixel electrode 111 is increased in the periphery of the pixel, including the end of the slit 1081 of the counter electrode 108. As a result, the electric field between the counter electrode 108 and the pixel electrode 111 is reduced. Thus, it is possible to prevent the occurrence of the domain.

In FIG. 10, the planar shape of the slit 1081 formed in the counter electrode 108 can be the shape of the slit 1081 described in the second embodiment. In other words, it may be a long rectangular shape as shown in FIGS. 5 and 7, or may be a shape with the bent end. In this case, the second interlayer insulating film 110 and the organic insulating film 109 are present between the counter electrode 108 and the pixel electrode 111 in the slit portion with the bent end. Further, multiple slits of the counter electrode 108 can be formed in the pixel.

In the above-described embodiments, the TFT is a so-called top-gate type TFT in which the gate electrode is present above the semiconductor. However, the present invention can also be applied to a so-called bottom-gate type TFT in which the gate electrode is present below the semiconductor.

What is claimed is:

1. A liquid crystal display device comprising a TFT substrate, a counter substrate, and a liquid crystal interposed between the TFT substrate and the counter substrate, wherein in the TFT substrate, a pixel is present in a region surrounded by scanning lines extending in a first direction and arranged in a second direction, and by video signal lines extending in the second direction and arranged in the first direction, wherein a counter electrode is formed flat on a first insulating film in the pixel, wherein a second insulating film is formed in the peripheral portion of the counter electrode, wherein a third insulating film is formed so as to cover the counter electrode and the second insulating film, wherein a pixel electrode is formed on the third insulating film, wherein the second insulating film and the third insulating film are present between the pixel electrode and the counter electrode in the peripheral portion of the pixel, wherein only the third insulating film is present between the pixel electrode and the counter electrode in the portion other than the peripheral portion of the pixel, wherein a distance between the pixel electrode and the counter electrode is larger at the peripheral portion of the pixel than a distance at an area other than the peripheral portion, and wherein the pixel electrode is connected to a source electrode of a TFT via a through hole formed in the first insulating film and the third insulating film, and the through hole is not formed in the second insulating film.

2. The liquid crystal display device according to claim 1, wherein the second insulating film is formed of an organic film.

3. The liquid crystal display device according to claim 2, wherein the first insulating film is formed of an inorganic film.

4. The liquid crystal display device according to claim 1, wherein the pixel electrode is bent at an end portion, and wherein the second insulating film and the third insulating film are present between the pixel electrode and the counter electrode in the portion in which the pixel electrode is bent.

5. The liquid crystal display device according to claim 1, wherein the pixel electrode has a slit, wherein the end portion of the pixel electrode, including an end portion of the slit, is bent, and wherein the second insulating film and the third insulating film are present between the pixel electrode and the counter electrode in the portion in which the pixel electrode is bent.

* * * * *